May 17, 1955    P. H. BORDEN    2,708,309
SAFETY RAZOR AND BLADE CHANGER
Original Filed Nov. 24, 1948    3 Sheets-Sheet 1
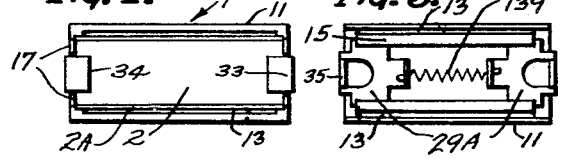
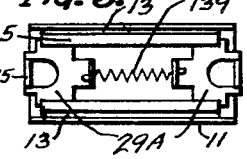
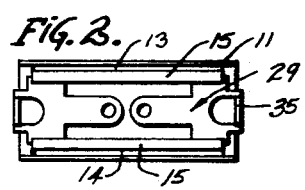
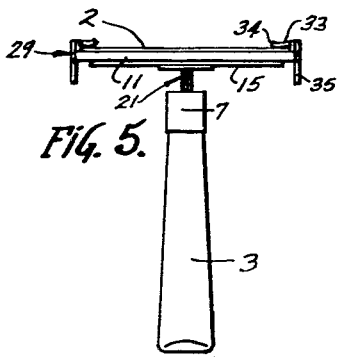
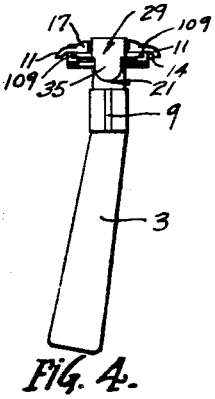
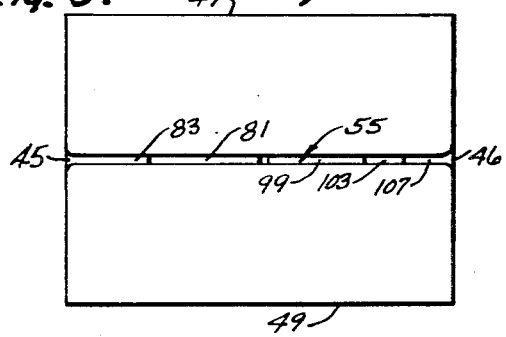
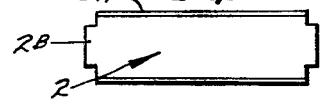
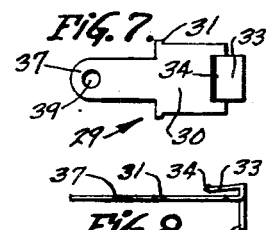
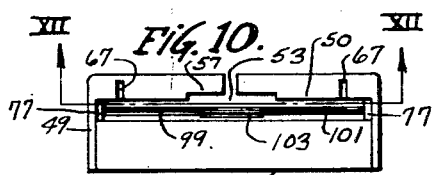
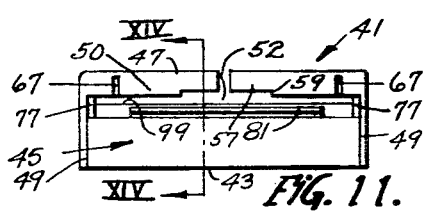
Inventor
PHILIP H. BORDEN
By Weatherford and Weatherford
Attorneys

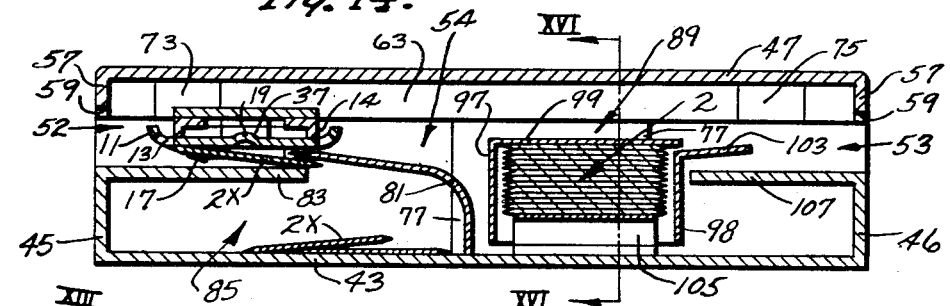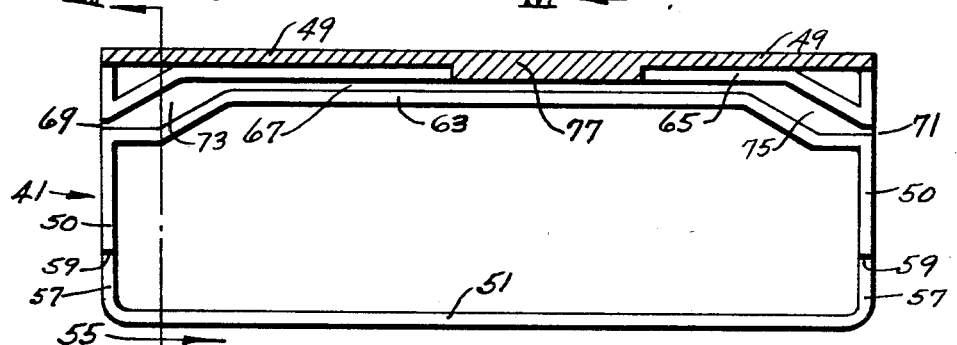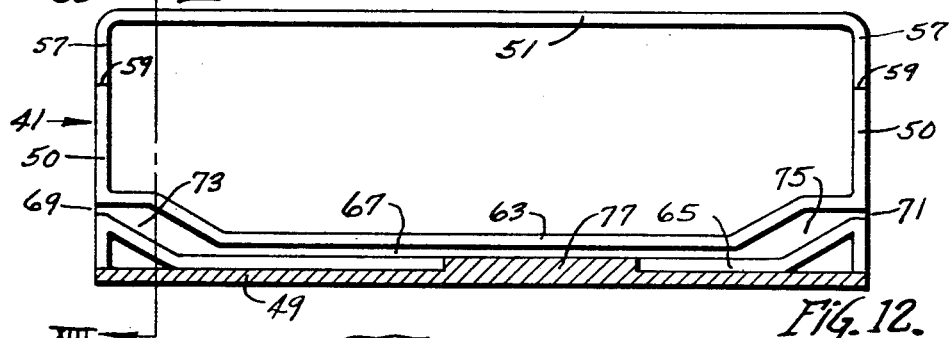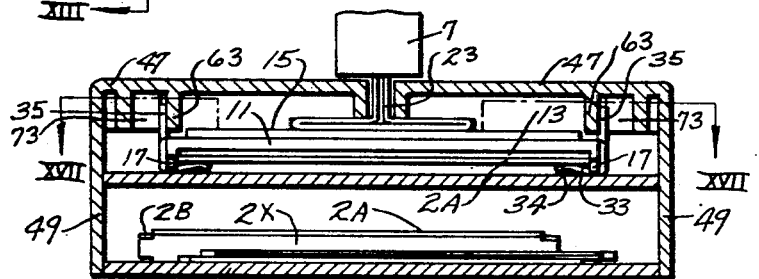

May 17, 1955 P. H. BORDEN 2,708,309
SAFETY RAZOR AND BLADE CHANGER
Original Filed Nov. 24, 1948 3 Sheets-Sheet 3

Inventor
PHILIP H. BORDEN
By Weatherford and Weatherford
Attorneys

United States Patent Office 2,708,309
Patented May 17, 1955

2,708,309

SAFETY RAZOR AND BLADE CHANGER

Philip H. Borden, Orange, Conn., assignor to Central Industrial Corporation, Memphis, Tenn., a corporation of Tennessee Continuation of application Serial No. 61,811, November 24, 1948. This application March 23, 1953, Serial No. 343,951

35 Claims. (Cl. 30—40)

This invention relates to certain new and useful improvements in razors, particularly of the type known as safety razors, and in automatic blade changers therefor. This application is a continuation of my co-pending application, Serial No. 61,811, filed November 24, 1948.

There has heretofore been considerable and extensive development in the field of razors employing changeable blades, and, in addition, considerable endeavor in connection with the development of means and devices for mechanically effecting blade change. All of these endeavors, however, have failed to produce a commercially satisfactory fully automatic blade changer in which no blade, new or used, is touched by hand.

The principal object of this invention is to provide a safety razor having a new and novel head for carrying a razor blade and a new and novel means for mechanically effecting change of blades in such head.

A further object of the invention is to provide with a blade carrying head having disengageable blade clamp means, a blade changer which includes a blade holding magazine and track means for engaging the depending portions of such clamp means to effect retraction thereof upon movement of the blade carrying head longitudinally of such track means to disengage a carried blade from such head.

A further object of the invention is to provide with a blade carrying head having disengageable blade clamping means, a blade changer which includes means for disengaging such clamping means to free a blade from such head, and means for supplying a new blade to such head.

A further object of the invention is to provide a blade changing mechanism for use with a razor head having movable blade engaging means, which mechanism comprises a blade ejector and a new blade supply disposed in substantial alinement for successive engagement by the razor head.

A further object of the invention is to provide such a mechanism adapted for positioning in a casing.

A further object of the invention is to provide such a blade carrying head and blade changer with means positioning one of a supply of razor blades for engagement by such head and return movement of such clamp means into clamping engagement with the newly engaged blade.

And a further object of the invention is to generally improve the design, construction and efficiency of means for mechanically effecting ejection of used razor blades and insertion of substitute new razor blades in a razor blade carrying device.

And a further object of the invention is to provide an automatic razor blade changer in the use of which no blade, new or used, is touched by hand.

The means by which the foregoing and other objects of this invention are accomplished and the manner of their accomplishment will be readily understood from the following specification upon reference to the accompanying drawings, in which:

Fig. 1 is a top plan view of the preferred form of razor blade carrying head with a blade in position thereon.

Fig. 2 is an inverted plan view of the preferred form of head of Fig. 1.

Fig. 3 is a view similar to Fig. 2 of a variation of the blade carrying head.

Fig. 4 is an end elevational view of the preferred form of blade carrying head and handle associated therewith.

Fig. 5 is a front elevational view of the blade carrying head and handle of the invention.

Fig. 6 is a plan view of a preferred form of blade for use with the blade head of this invention.

Fig. 7 is a top plan view, on a similar scale, of the preferred form of blade holding clamp member employed herein.

Fig. 8 is an edge view on a similar scale of the preferred form of blade holding clamp member.

Fig. 9 is a top plan view of the automatic blade changer casing of the invention.

Fig. 10 is a rear elevational view of such casing.

Fig. 11 is an elevational view of the front of such casing.

Fig. 12 is an inverted sectional plan view taken on the line XII—XII of Fig. 10 on a further enlarged scale.

Fig. 13 is a transverse sectional view taken as on the line XIII—XIII of Fig. 12, with the blade carrying head shown exterior the casing in position for entry thereinto.

Fig. 14 is a longitudinal sectional elevation on a scale similar to that of Fig. 13, taken as on the line XIV—XIV of Fig. 11, showing the blade carrying head within the casing in blade discharging position.

Figure 20:
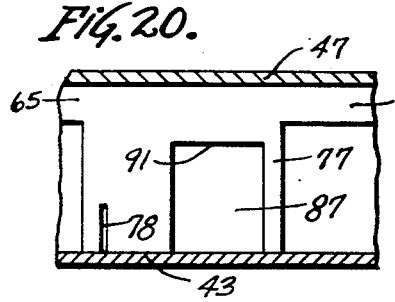
Fig. 20 is a fragmentary longitudinal sectional elevation showing a portion of the inner face of one of the casing side walls and associated casing parts.
Figure 15:
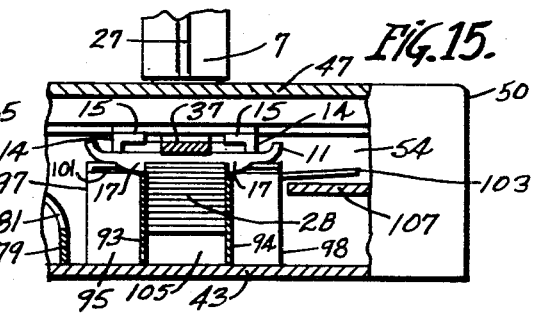
Fig. 15 is a fragmentary side view of the rear portion of the blade changing casing with certain parts broken away adjacent the rear end thereof to show the blade carrying head in razor blade receiving position therein.
Figure 17:
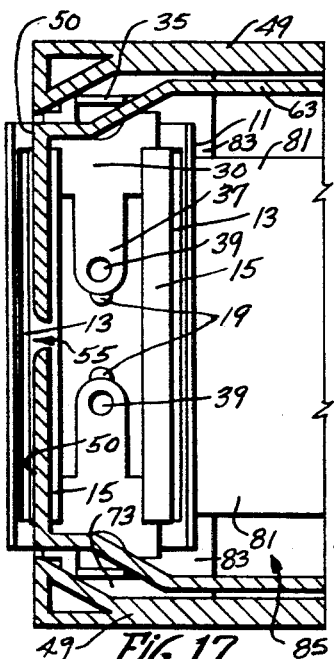
Fig. 17 is a fragmentary sectional plan view taken as on the line XVII—XVII of Fig. 13 illustrating the front or entrance end of the automatic blade changer and the relation of the parts of the blade carrying head just after entry thereinto.
Figure 18:
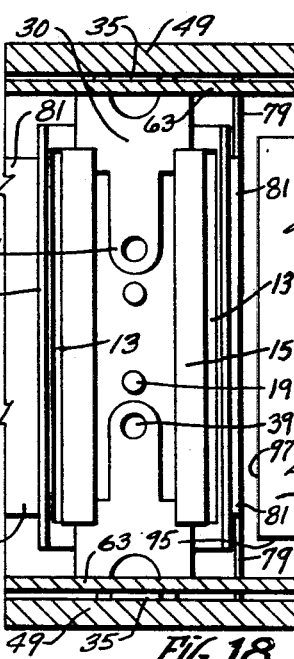
Fig. 18 is a similar fragmentary sectional plan view taken as on the line XVII—XVII of Fig. 13 illustrating an intermediate section of the automatic blade changer and the relation of the parts of the blade carrying head when positioned therein during approach toward the position of Fig. 16.
Figure 19:
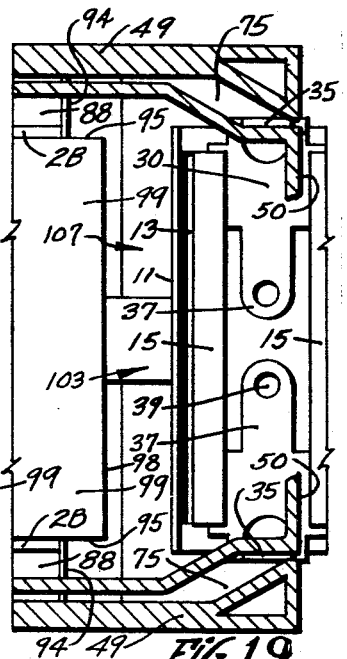
Fig. 19 is a similar fragmentary sectional plan view taken as on the line XVII—XVII of Fig. 13 illustrating the exit end of the automatic blade changer and the relation of the parts of the blade carrying head thereto when positioned therein after completion of blade change and just prior to exit from the casing.
Figure 16:
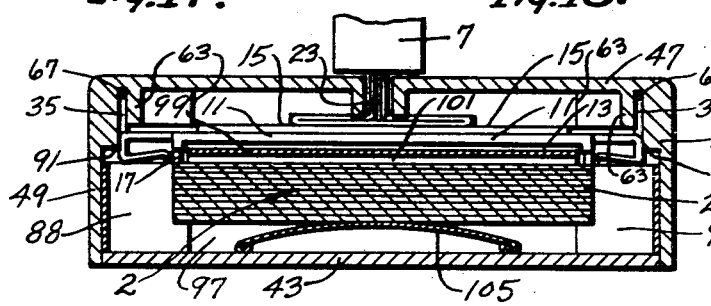
Fig. 16 is a transverse sectional view taken as on the line XVI—XVI of Fig. 14 showing the blade carrying head within the casing in a position just prior to the blade receiving position of Fig. 15.

Referring now to the drawings in which the various parts are indicated by numerals: The razor of this device comprises a blade carrying head 1 for carrying a razor blade 2, which head is attached to and supported by a handle 3. Preferably the blade 2 is of the double edged variety provided with cutting edges 2A and the corners are notched to form end tabs 2B. The handle 3 is preferably angularly offset to provide an offset upper portion 5, to which is rigidly fixed a hollow sleeve-like ferrule 7.

The blade carrying head 1 preferably has its opposite edges turned downwardly to form guide bars 11. Preferably the head is slotted adjacent and parallel with the guide bars 11 by longitudinally extending slots 13, which may be formed by die stamping the head and downwardly deforming lug portions 14 thereof, to depend from the respective edges of the slots remote from the guide bars 11. Such downwardly deformed lug portions are preferably folded away from the slots 13 and below the body of the blade head to form restraining flanges 15 which extend longitudinally of the blade head and are preferably coextensive in length with the slots 13. While it is preferred that the portions 14 and flanges 15 be thus formed integral with and of the material of the head 1, they may, if preferred, be formed separately and attached to the blade head in suitable manner. It is to be noted that the flanges 15 extend longitudinally of the head and essentially comprise a flat portion disposed parallel to and below the head and spaced therefrom.

At each end of the upper side of the blade head 1 a pair of transversely spaced upstanding dogs 17 are formed, preferably integrally with the blade head, and are each provided on their proximate faces with a vertically disposed surface adapted to engage the notched corners of the blade 2 to prevent displacement thereof laterally of the head, and an opposite arcuate surface. The dogs are respectively positioned adjacent but between the proximate edges of the slots 13. The blade head 1 is further provided with downwardly projecting knob-like bosses 19 which are positioned substantially on the longitudinal center line of the blade head.

Attached to and spanning between the undersides of the flat flange portions 15 is a substantially T-shaped clip 21 by which the blade head is connected to the ferrule 7.

The lug portions 14 and flanges 15 form guideways extending longitudinally of head 1 and which are adapted to slidably receive slide members 29, there being one of the members 29 for each of the opposite ends of the blade holding head to engage the end tabs of the razor blade 2 to retain the blade upon the head. The members 29 are of a thickness to closely and slidably fit in the space between the flat flange-like portions 15 and the bottom of the blade head 1. The main body 30 of each of the members 29 is of a width to span between and overlap the proximate edges of the flanges 15 so that the members are retained within the guideways against vertical movement relative thereto and are slidable thereinto.

Preferably the main body 30 of each of the slide members 29 is cut away along a majority of its length to provide shoulders 31 projecting from the main body and disposed adjacent the inner end of the main body. At the outer end of the main body of each member 29 a substantially U-shaped, resilient clamp portion 33 is attached or formed integrally with the main body, one leg of the U preferably comprising a continuation of the main body. The other leg of the U overlies and is spaced from the upper face of the main body of the member 29 and converges theretoward, terminating in a free end 34, which is adapted to slip over the blade head and an end tab of a blade 2 to clampingly engage such end tab and hold it against the upper face of the blade head 1. Preferably each member 29 is die stamped adjacent its related clamp portion to form a downwardly projecting ear 35 which is disposed substantially at right angles to the main body of the member.

The inner end of the main body 30 of each member 29 is provided with a tongue 37 lying in the same plane with the main body of the member and projecting inwardly therefrom, the tongue 37 being preferably of a width substantially less than the width of the main body, and at its inner end having an aperture 39 formed therein substantially on the mid line thereof. It will be noted that each member 29, including its main body 30, shoulders 31, clamp portion 33, ear 35 and tongue 37, is preferably formed of a single integral portion of suitably resilient material. It will be understood that the members may be otherwise formed and integrated in desired fashion without departing herefrom.

In assembly of the razor, the blade head 1 may be formed with the blade retaining dogs 17 and the clamp retaining guideways 14, 15, as well as the knob-like bosses 19. The T clip 21 is formed and rigidly secured to the under side of the flanges 15, preferably by welding. The members 29 may then be inserted in the guideways formed by portions 14 and flanges 15, with the tongues 37 projected toward the center of the blade head and with the clamp portions 33 overlying the upper face of the blade head. As the members 29 are moved inwardly toward each other the apertures 39 of the tongues 37 engage the downwardly projecting knob-like bosses 19, the resilient tongues yielding sufficiently to enable the tongue ends to pass over the bosses to bring the apertures into engagement with the bosses. In this manner the members 29 are retained against undesired outward movement longitudinally of the blade head 1.

In the alternative form illustrated in Fig. 3, a tension spring 139 is provided, lying between the base of blade head 1 and flanges 15 and being attached at its opposite ends to the respective members 29A, which differ from the members 29 in that the tongues thereof and the bosses are omitted. The spring 139 is adapted to retain the members 29A in clamping position and upon separation of the members and the outward movement thereof longitudinally of the blade head urges return inward movement of the members into blade clamping position.

The ferrule 7 may then be fixed to the offset upper portion 5 of the handle 3 and clip 21 may then be inserted in the ferrule 7.

While manual positioning of the blade 2 upon the blade head 1 may be effected, it is preferred, and is the purpose of this invention, to provide an automatic blade changer consisting of a casing 41 which is adapted to receive the blade head 1 for movement longitudinally and rearwardly thereof and is provided with means for effecting movement of retractable blade engaging means, which in the present embodiment is an outward separating movement of the members 29 or 29A, and consequent release of the previously clamped blade 2, means for positioning a new blade 2 in the blade 1 for engagement by the members 29 or 29A upon return closing inward movement of the members and means for effecting this inward closing movement, all during such longitudinal blade head movement.

It will be understood that while the automatic blade changer is here illustrated as operating blade engaging members which are retractable longitudinally of the razor head, the principles of the invention are equally applicable for use with blade engaging means which are otherwise retractable; that is, shiftable out of blade engagement either by sliding movement or by hinged movement and, therefore, the invention is not intended to be limited to longitudinally or slidably retractable members except where specifically so defined in the claims.

The casing 41 comprises a bottom 43, having upstanding front and rear walls 45, 46 integrated with the opposite ends thereof, and a pair of top members 47, each top member having a depending integral side wall 49. Preferably the bottom, top, and wall members of the casing 41 are formed of a suitable plastic, although obviously other suitable material might be substituted as desired. When, as preferred, plastic is employed, the entire casing may be thermally integrated, or if metals are employed the casing may be integrated by brazing or welding.

The depending side walls 49 along their lower edges are attached to the outer edges of the bottom 43 and the lower portion of the side walls along the front and rear edge portions thereof are attached to the opposite vertical edges of the walls 45, 46. It will be seen that the side walls 49 extend above the upper edges of the walls 45, 46 so as to space the top members thereabove. The top members 47 are each provided along their ends and inner edges with a continuous rim comprising transverse end rim portions 50 and inner longitudinal rim portions 51 which depend a minor distance below the top members 47. It will be seen that the lower edges of the rim portions 50 are spaced above the top edges of the end walls 45 to provide a front entrance opening 52 into the casing 41 and rear exit opening 53 therefrom, these openings forming respectively the front and rear terminals of a passageway 54 which extends through the casing from end to end.

The top members 47 extend inwardly from the side walls 49 and lie in the same plane, substantially parallel to the bottom 43. The top member inner edges are disposed in spaced relation to provide an elongated slot 55 communicating with the passageway 54 and joining entrance 52 and exit 53. It will be seen that the slot 55 is disposed substantially on the longitudinal mid line of the casing 41.

The end portions 50 intermediate their lengths are upwardly offset to provide offset portions 57 which each terminate in a shoulder 59. The offset portions 57 merge into the inner rim portions 51, and, as will be seen from the drawings, the offset portions 57 and the rim portions 51 depend from the top members 47 a uniform depth which is less than the depth of the rim end portion 50.

Depending from the under side of each of the top members 47 is an inner track wall 63 which connects with the rim portions 50 and depends below the top member a distance equal to the depth of the rim portion 50. Similarly depending from the top members 47 are outer track walls 65 which are spaced from the inner track walls to provide opposite trackways 67. Each of the trackways 67 is provided with an entrance opening 69 and an exit opening 71, these openings being spaced apart laterally of the top members 47 a distance equal to the spacing of the clamp ears 35 in blade engaging position of the members 29. The trackways 67 diverge, as at 73, outwardly from the entrance openings 69 to a point adjacent the side walls 49 and extend rearwardly toward the opposite end of the casing 41 along the side walls 49 to a point adjacent the exit end of the casing where the trackways converge, as at 75, to the exit openings 71. It will be noted that the trackway portions of divergence and convergence are enlarged to accommodate the width of the ears 35 as the ears are moved along the trackway from end to end of the casing.

Intermediate their lengths the side walls 49 are each provided with a support member 77 which is integral with and depends from the respective outer track walls 65. The support members 77 lie in the same plane as the said outer track walls and are of substantially the same thickness. The support members extend downwardly along the respective side walls and terminate adjacent but above the lower edges of the side walls so as to seat upon the upper surface of the bottom 43 when the casing 41 is assembled and integrated. It will be noted that preferably the forward edge of the support members 77 is disposed slightly forward of the vertical mid line of the associated side walls and that the support members extend rearwardly along the side walls substantially beyond the vertical mid line of the side walls.

Adjacent their forward edges the support members are provided with slots or grooves 78 which extend vertically upward from the bottom edges of the support members and are adapted to receive and retain the tab-like end portions 79 of a resilient ejector baffle 81.

The ejector baffle 81 is preferably curved so as to project its free end from the supports 77 toward the forward end of the casing 41. The free end of the baffle preferably overlaps and is spaced above the rear end of an extension 83 of front wall 45. The extension 83 preferably spans between the side walls 39 and is secured thereto, preferably integrally, and is also preferably integrally secured to the upper edge of the front wall 45 and extends rearwardly therefrom parallel to the bottom 43. The extension 83 and the ejector baffle 81 cooperate with the forward and lower portions of the side walls 49 and the front wall 45 to form a chamber 85 below passageway 54 for the reception of razor blades discharged from the blade head 1. The upper face of extension 83 also serves as a portion of the floor of the passageway 54.

The supports 77 rearward of the vertical baffle grooves 78 therein are cut out to form downwardly open pockets 87 adapted to receive end portions 88 of a blade holding magazine 89. The pockets 87 are preferably of a greater depth than the depth of the blade holding magazine 89 and the closed ends 91 of the pockets are spaced above the bottom 43 in excess of the depth of end portions 88, so as to permit limited vertical movement of the magazine therein.

The magazine end portions 88 include vertical front and rear wall portions 93, 94 which are spaced apart longitudinally of the casing to receive and closely fit the end tabs 2B of the blade 2. The end portions 88 are open top and bottom and along their vertical inner edges are secured to the edges of vertical end walls 95 of the main body of the magazine 89. The point of attachment between the respective end portions walls and the magazine end walls are adapted to loosely engage the corner notches of the blades 2. The main body of the magazine 89 is further provided with a front wall 97 and a rear wall 98 which are each joined to and extend between the opposite magazine end walls. The front magazine wall 97 extends above the upper edges of the magazine end walls and the walls of the end portions and is provided with a rearwardly extending flat top 99 which is rigidly attached to the top edge of the front wall and is disposed substantially parallel to the casing bottom 43 and the casing top members 47. The top 99 overlies the main body of the magazine 89 and extends rearwardly to the edge of the magazine rear wall 98. The underside of the top wall 99 is thus spaced above the vertical magazine walls 95, this spacing being equal to or minutely in excess of the thickness of one of the blades 2. In any event this spacing must be less than the thickness of two of the blades 2. The side and rear edges of the top 99 are unattached to provide a space 101 for the rearward movement of a blade 2 from the magazine 89.

Projecting rearwardly from the upper edge of the magazine rear wall 98 is a flat prong member 103, the rear end of which is positioned slightly above the forward edge thereof so that the rearwardly projecting prong diverges from the casing bottom 43. The magazine 89 is open throughout its bottom and is not attached to the casing 41 or engaged thereby except through the sliding engagement of the end portions 88 with the wall pockets 87.

Within the main body of the magazine a resilient member 105, preferably an arched leaf spring, is positioned beneath the plurality of blades 2 housed within the magazine 89. The opposite ends of the spring 105 bear against the upper surface of the casing bottom 43 and the upper portion of the arch of the spring bears against the under side of the magazine held blades 2. As will be seen, the spring 105 constantly urges the blades upwardly within the magazine, causing the uppermost blade 2 to engage the under surface of the top wall 99 and to be positioned opposite the blade discharge space 101. It will also be seen that as the magazine 89 is unattached along its bottom edge it is also urged upwardly within the limits provided by the pockets 87 to project the top wall 99 of the magazine and the uppermost magazine-housed blade 2 into the passageway 54 of the casing, spaced as shown in Fig. 14 below the level of the trackways.

The rear wall 46 of the casing is provided with a forwardly projecting extension 107 which is similar to the front wall extension 83. This extension underlies the prong member 103 and serves further as the terminal portion of the floor of the passageway 54 of the casing.

In the assembly of the automatic blade changer the blades 2 in desired number are positioned in the magazine 89. Spring member 105 is inserted in the open bottom of the magazine beneath the blades 2. The magazine end portions 83 are inserted in the pockets 87 and the baffle end portions 79 are inserted in the baffle grooves 78. The top members 47, their integral side walls 49, and support members 77 may then be positioned for integration with the bottom 43 and the front and rear walls 45, 46. The device when thus assembled is ready for operation.

In use of the blade changer for automatically effecting blade change in the blade head 2, the blade head is inverted so that the clamp ears 35 are projecting upwardly and positioned for entry into the forward end of the slot 55. These positions of the parts are best shown in Fig. 13. It will be noted that the offset portions 57 provide an entrance for the seat portion of the clip 21 into the casing passageway 54. It will also be seen that the ferrule 7 is positioned closely adjacent the upper surface of the top members 47 and that the lower edges of the rim inner portions 51 are substantially in abutment with the seat portion of the clip 21, these engagements maintaining the alinement of the blade head 1 throughout its movement longitudinally of the casing passageway 54.

As the blade head is moved rearwardly the ears 35 are engaged by the respective trackways 67 and pass into the divergence portions 73 of the trackways, causing the ears to be moved outwardly and consequently moving the clamp portions 33 of the members 29 outwardly to free the end tabs 2B of the blades 2. As the members 29 are thus moved outwardly the sides of the main body 30 move in the guideways formed by the portions 14 and flanges 15 and are moved outwardly until the shoulders 31 of the members 29 are brought substantially to the respective outer ends of the guideways of the razor.

If desired, abutment members 109 may be attached within the guideways at the opposite ends thereof, these abutments being adapted to be engaged by the shoulders 31 to prevent accidental movement of the members 29 beyond the confines of the trackway. It will be noted that the abutment members 109 are of such size as to permit the free sliding movement therebetween of the cut-away portions of the main body 30 of each of the members 29.

When the clamp portions 33 have been moved outwardly beyond the ends of the blade 2 the blade is free to fall from the holder by gravity. Wall extension 83 is positioned to receive gravity discharged blades and is spaced from dog 17 preferably less than a blade thickness so that further rearward movement will cause the dogs to move the loosened blade rearwardly. The free end of the baffle 81 is disposed preferably just above the rearward cutting edge of the head-carried blade 2 and is positioned to pass between the blade and the head as the head is moved further rearwardly to insure separation of the blade from the head and discharge of the blade into the chamber 85 which is provided to retain and house used blades 2X. After the used blade 2X has been freed from the head 1 further rearward movement of the head brings the head into engagement with the magazine 89.

The rear guide bar 11 is brought into contact with the magazine substantially at the junction of the top wall 99 with the front magazine wall 97. The engagement forces the magazine downwardly, the spring 105 yielding to the force and this movement being facilitated by the rounded cam-like surface of the blade head at the guide bar 11. Further advancement of the blade head maintains the depressed position of the magazine 89 and brings the leading dogs 17 into contact with the exposed upper face of the end tabs of the uppermost blade 2. The arcuate faces of the dogs 17 ride onto the blade tab and cause depression of the blades within the magazine 89, permitting the passage of the leading blade dogs thereover. As the leading dogs 17 pass the rear edge of the blade tabs, the blades are released from the restraint imposed by the dogs during passage thereover, and the top blade 2 is urged upwardly into position against the under surface of the top wall 99 and with the end tabs positioned between the respective vertical faces of the dogs 17. The blade is thus engaged by the dogs for movement with the blade head and being then positioned opposite the discharge space 101, moves rearwardly with the blade head and away from the magazine 89. As the blade passes through the space 101 it is brought into contact with the upper surface of the prong-like member 103, the divergence of the prong member from the bottom 43 effectively seating the blade against the blade head and holding the blade in this position as the ears 35 reach the convergence portion 75 of the trackways 67.

Further rearward movement moves the ears through the convergence portion 75, effecting movement of the members 29 inwardly along the blade head guideways and bringing the clamp portions 33 into clamping engagement with the end tabs 2B of the blades 2, this inward movement of the members 29 reestablishing engagement of the bosses 19 by the tongue apertures 39, the movement being completed as the ears 35 reach the exit openings 71 of the trackways 67.

It will further be seen that the automatic blade changer of this invention is able to fully effect removal of used blades and substitution of new blades without any blade being touched by hand, either for insertion or disposal, the used blades being retained within the casing and the new blades supplied from the magazine. The blade changer is effective to cause disengagement of blade engaging means, to release a used blade and free the razor head, and provides means for positioning a new blade for engagement by the blade-free head, which means cooperate with the head to select a new blade and remove same with the head, to be retained upon the head upon reengagement of the blade engaging means.

I claim:

1. A shaving device combination which comprises a razor blade having a longitudinal shaving edge and transverse end tabs, a blade carrier including a blade contacting face and clamp means slidably mounted on opposite ends of said carrier, said clamp means overlying said end tabs and clamping them to said face, and a blade changer, having a passageway for movement of said carrier therethrough and trackways guiding said clamp means during said carrier movement to free said end tabs and release said blade.

2. A shaving device combination which comprises a razor blade having longitudinal shaving edges and transverse end tabs, a blade carrier including a blade contacting face and clamp means slidably mounted on opposite ends of said carrier, said clamp means overlying said end tabs and clamping them to said face and including portions projecting away from said face, and a blade changer, having a passageway for movement of said carrier therethrough, and trackways guidingly engaging said clamp means portions during said carrier movement to effect sliding of said clamp means to free said end tabs and release said blade.

3. An automatic blade changer for inserting a razor blade in a blade carrying head, which head when inverted includes a downwardly facing blade-receiving face having blade-engaging means, and a pair of clamp members each including an integral, upwardly extending ear, said clamp members being slidably mounted on said head for movement from an inward clamping position, in which said clamp members respectively substantially abut the opposite ends of said head and closely underlie opposite end portions of said face for clampingly embracing the ends of a razor blade received on said face, to an outward release position, in which said clamp members are positioned out of engagement with said face, and return movement to said inward clamping position; which blade changer comprises a casing having a front opening for the entrance of said head thereinto, a rear opening for the exit of said head therefrom and a longitudinal passageway connecting said openings for the passage of said head through said casing, said casing including a top overlying said passageway, longitudinally extending trackways secured to said top and downwardly open into communication with said passageway, said trackways being adapted to slidably receive said ears during passage of said head through said casing and having front entrance openings and rear exit openings communicating respectively with said passageway entrance and exit for ear entrance and exit and respectively spaced apart transversely of said casing a distance equal to the spacing of said ears in said inward clamping position by said clamp members, said trackways rearward of said trackway entrances diverging outwardly, said trackways being then spaced apart a distance equal to the spacing of said ears in said outward release position of said clamp members, engagement of said ears by said diverging trackways effecting said clamp member movement during a preliminary portion of said head passage, means for positioning a razor blade in said passageway for engagement by said blade engaging means while said clamp members are in said outward release position, said trackways rearward of said blade positioning means converging to said trackway rear exit openings to effect said return movement of said clamp members during the final portion of said head passage, whereby to effect clamping of the blade engaged by said head.

4. An automatic blade changer for inserting a razor blade in a blade carrying head, which head when inverted includes a downwardly facing blade-engaging face, and a pair of clamp members each including an integral, upwardly extending ear, said clamp members being slidably mounted on said head for movement from an inward clamping position, in which said clamp members respectively substantially abut the opposite ends of said head and closely underlie opposite end portions of said face for clampingly embracing the ends of a razor blade engaged by said face, to an outward release position, in which said clamp members are positioned out of engagement with said face, and return movement to said inward clamping position; which blade changer comprises a casing having a front opening for the entrance of said head thereinto, a rear opening for the exit of said head therefrom and a longitudinal passageway connecting said openings for the passage of said head through said casing, said casing including a top overlying said passageway, longitudinally extending trackways secured to said top and downwardly open into communication with said passageway, said trackways being adapted to slidably receive said ears during passage of said head through said casing and having front entrance openings and rear exit openings communicating respectively with said passageway entrance and exit for ear entrance and exit and respectively spaced apart transversely of said casing a distance equal to the spacing of said ears in said inward clamping position of said clamp members, said trackways rearward of said trackway entrances diverging outwardly, said trackways being then spaced apart a distance equal to the spacing of said ears in said outward release position of said clamp members, engagement of said ears by said diverging trackways effecting said clamp member movement during a preliminary portion of said head passage, means for positioning a razor blade in said passageway for engagement by said blade head while said ears are in said outward release position, said trackways rearward of said blade positioning means converging to said trackway rear exit openings to effect said return movement of said clamp members during the final portion of said head passage, whereby to effect clamping of the blade engaged by said head.

5. An automatic blade changer for removing a razor blade from, and inserting a replacement razor blade in, a blade carrying head, which razor blades have end tabs and corner notches, said head when inverted including a downwardly facing blade-engaging face, having corner dogs for engaging said blade notches, and a pair of clamp members, each including an integral upwardly extending ear, said clamp members being slidably mounted on said head for movement from an inward clamping position, in which said clamp members respectively substantially abut the opposite ends of said head and closely underlie the opposite end tabs of a said blade for clamping the end tabs of said blade on said face, to an outward release position, in which said clamp members are positioned out of engagement with said end tabs, and return movement to said inward clamping position; which blade changer comprises a casing having a front opening for the entrance of said head thereinto, a rear opening for the exit of said head therefrom and a longitudinal passageway connecting said openings for the passage of said head through said casing, said casing including a top overlying said passageway, longitudinally extending trackways secured to said top and downwardly open into communication with said passageway, said trackways being adapted to slidably receive said ears during passage of said head through said casing and having front openings for ear entrance and rear openings for ear exit, said trackway openings communicating respectively with said passageway entrance and exit and being respectively spaced apart transversely of said casing a distance equal to the spacing of said ears in said clamping position, said trackways rearward of said openings diverging to a spacing equal to the spacing of said ears when said clamps are in said outward release position of said clamp members, engagement of said ears by said diverging trackways effecting said clamp member movement during a preliminary portion of said head passsage, said casing having support means mounted therein spaced rearwardly from said trackway divergence, a resilient ejector baffle secured in said support means and extending forwardly therefrom to terminate in a free edge which is disposed in said passageway in the path of said head adjacent but rearward of said divergence to contact said face during head passage and separate said razor blade from said face, a chamber underlying said baffle and positioned to receive said separated blade, a magazine mounted for limited vertical movement in said support means rearward of said baffle, a plurality of replacement razor blades housed in said magazine, a resilient member underlying said plurality of blades and urging said blades and said magazine upwardly to project into said passageway and position one of said plurality of blades for engagement by said dogs during head passage while said clamp members are in said outward release position, said trackways rearward of said magazine converging to said trackway exit openings, engagement of said ears by said converging trackways effecting said return movement of said clamp members to effect clamping of the blade engaged by said dogs during the final portion of said head passage.

6. An automatic blade changer for removing a razor blade from, and inserting a replacement razor blade in, a blade carrying head, which razor blades have end tabs, said head when inverted including a downwardly facing blade-engaging face, a pair of clamp members, each including an integral upwardly extending ear, said clamp members being slidably mounted on said head for movement from an inward clamping position, in which said clamp members respectively substantially abut the opposite ends of said head and closely underlie the opposite end tabs of a said blade for clamping the end tabs of said blade on said face, to an outward release position, in which said clamp members are positioned out of engagement with said end tabs, and return movement to said inward clamping position; which blade changer comprises a casing having a front opening for the entrance of said head thereinto, a rear opening for the exit of said head therefrom and a longitudinal passageway connecting said openings for the passage of said head through said casing, said casing including a top overlying said passageway, longitudinally extending trackways secured to said top and downwardly open into communication with said passage, said trackways being adapted to slidably receive said ears during passage of said head through said casing and having front openings for ear entrance and rear openings for ear exit, said trackway openings communicating respectively with said passageway entrance and exit and being respectively spaced apart transversely of said casing a distance equal to the spacing of said ears in said inward clamping position of said clamp members, said trackways rearward of said trackway entrances diverging outwardly to space said trackways apart a distance equal to the spacing of said ears in said outward release position of said clamp members, engagement of said ears by said diverging trackways effecting said clamp member movement during a preliminary portion of said head passage to release said blade, a magazine mounted for limited vertical movement in said casing rearward of said trackway divergence, a plurality of replacement razor blades housed in said magazine, a resilient member underlying said plurality of blades and urging said blades and said magazine upwardly to project into said passageway and position one of said plurality of blades for engagement by said face during head passage while said clamp members are in said outward release position, said trackway means rearward of said magazine converging to said trackway rear exit openings to effect said return movement of said clamp members during the final portion of said head passage, whereby to effect clamping of the said replacement blade engaged by said face.

7. An automatic blade changer for use with a blade holding head which head includes a blade engaging face, and retractable clamps for removably attaching a blade to said face, said clamps each including a projecting lug; said changer including a longitudinal passageway extending from end to end of said changer and being open for the passage of said head therethrough in inverted position with said face disposed downwardly, trackway means associated and communicating with said passageway, said trackway means including an initial diverging section, an intermediate diverged section, and a final converging section, lying in the path of and positioned to engage and guide said clamp means during the passage of said inverted head along said passageway, lug engagement and passage along said initial section retracting said clamps to release said blade attachment for gravity deposit of a released blade, a blade receiving chamber underlying said passageway adjacent said clamp retracting means to receive a said released blade, a blade containing magazine communicating with said passageway intermediate the length of said passageway having a blade discharge portion lying in the path of said face during an intermediate portion of the passage of said inverted head through said passageway, and magazine housed means urging a magazine contained blade into said discharge portion for engagement by said face, said final trackway section guiding said lugs during the final portion of the passage of said head along said passageway to advance said clamps into clamping engagement with said head.

8. An automatic blade changer for use with a blade holding head which head includes a blade engaging face and retractable clamps for removably attaching a blade to said face, said clamps each including a projecting lug; said changer including a longitudinal passageway extending from end to end of said changer and being open for the passage of said head therethrough in position with said face disposed downwardly, trackway means associated and communicating with said passageway, said trackway means including an initial diverging section, an intermediate diverged section and a final converging section lying in the path of and positioned to engage and guide said lugs during the passage of said head along said passageway, lug engagement and passage along said initial section retracting said clamps to release said blade attachment for gravity deposit of a released blade, a blade containing magazine communicating with said passageway intermediate the length of said passageway having a blade discharge portion lying in the path of said face during an intermediate portion of the passage of said inverted head through said passageway, and magazine housed means urging a magazine contained blade into said discharge portion for engagement by said face, said final trackway section guiding said lugs during the final portion of the passage of said head along said passageway to advance said clamps into clamping engagement with said head.

9. An automatic blade changer for use with a blade holding head which head includes a blade engaging face and retractable clamp means for removably attaching a blade to said face; said changer including a longitudinal passageway extending from end to end of said changer and being open for the passage of said head therethrough in inverted position with said face disposed downwardly, clamp retracting means associated with and adjacent one end of said passageway, said retracting means lying in the path of and positioned to engage said clamp means during the initial portion of the passage of said inverted head along said passageway to retract said clamp means and release said blade attachment for gravity deposit of a blade released by clamp retraction, a blade receiving chamber underlying said passageway adjacent said clamp retracting means to receive a said released blade, a blade containing magazine communicating with said passageway intermediate the length of said passageway and having a blade discharge portion lying in the path of said face during an intermediate portion of the passage of said inverted head through said passageway, magazine housed means urging a magazine contained blade into said discharge portion for engagement by said face, and clamp advancing means associated with said passageway adjacent its opposite end, lying in the path of said retracted clamp means during the final portion of the passage of said head along said passageway to advance said clamp means into clamping engagement with said head.

10. An automatic blade changer for use with a blade holding head which head includes a blade engaging face and retractable clamp means for removably attaching a blade to said face; said changer including a longitudinal passageway extending from end to end of said changer and being open for the passage of said head therethrough, clamp retracting means associated with and adjacent one end of said passageway, said retracting means lying in the path of and positioned to engage said clamp means during the initial portion of the passage of said head along said passageway to retract said clamp means and release said blade attachment, a magazine for containing blades communicating with said passageway intermediate the length of said passageway and having a blade discharge portion lying in the path of said face during an intermediate portion of the passage of said head through said passageway, magazine housed means for urging a magazine contained blade into said discharge portion for engagement by said face, and clamp advancing means associated with said passageway adjacent its opposite end, lying in the path of said retracted clamp means during the final portion of the passage of said head along said passageway to advance said clamp means into clamping engagement with said head.

11. An automatic blade changer for use with a blade holding head which head includes a blade engaging face and retractable clamp means for removably attaching a blade to said face; said changer including a longitudinal passageway extending from end to end of said changer and being open for the passage of said head therethrough, clamp retracting means associated with and adjacent one end of said passageway, said retracting means lying in the path of and positioned to engage said clamp means during the initial portion of the passage of said head along said passageway to retract said clamp means and release said blade attachment for removal of a blade from said face, a magazine for containing blades communicating with said passageway intermediate the length of said passageway and extending into the path of said face during an intermediate portion of the passage of said head through said passageway, means for urging a magazine contained blade into the path of said face for engagement by said face, and clamp advancing means associated with said passageway adjacent its opposite end, lying in the path of said retracted clamp means during the final portion of the passage of said head along said passageway to advance said clamp means into clamping engagement with said head.

12. An automatic blade changer for use with a blade holding head which head includes a blade engaging face and means clamping a blade to said face; said changer including a longitudinal passageway extending from end to end of said changer and being open for the passage of said head therethrough, means associated with and adjacent one end of said passageway positioned to engage said clamping means during the initial portion of the passage of said head along said passageway to unclamp said clamping means and release said clamped blade from said face, a magazine for containing blades communicating with said passageway intermediate the length of said passageway and extending into the path of said face during an intermediate portion of the passage of said head through said passageway, means for urging a magazine contained blade into the path of said face for engagement by said face, and means associated with said passageway adjacent its opposite end engaging said clamping means during the final portion of the passage of said head along said passageway to effect reclamping engagement of said clamping means with said head.

13. An automatic blade changer for use with a blade holding head which head includes a blade engaging face and means for removably attaching a blade to said face; said changer including a longitudinal passageway extending from end to end of said changer and being open for the passage of said head therethrough, means associated with and adjacent one end of said passageway for releasing said blade attaching means for removal of a blade from said face during an initial portion of the passage of said head along said passageway, a magazine for containing blades communicating with said passageway intermediate the length of said passageway and extending into the path of said face during an intermediate portion of the passage of said head through said passageway, means for urging a magazine contained blade into the path of said face for engagement by said face, and means associated with said passageway adjacent its opposite end effecting reengagement of said blade attaching means during the final portion of the passage of said head along said passageway.

14. An automatic blade changer for use with a blade holding head which head includes a blade engaging face and retractable clamp means for removably attaching a blade to said face; said changer including a longitudinal passageway extending from end to end of said changer and being open for the passage of said head therethrough, a blade containing magazine communicating with said passageway intermediate the length of said passageway and extending into the path of said face during the passage of said head through said passageway, means urging a magazine contained blade into the path of said face for engagement by said face, and clamp moving means associated with said passageway, lying in the path of and engaging said clamp means during the passage of said head along said passageway beyond said magazine to move said clamp means into clamping engagement with said head.

15. An automatic blade changer for use with a blade holding head which head includes a blade engaging face and retractable clamp means for removably attaching a blade to said face; said changer including a longitudinal passageway extending from end to end of said changer and being open for the passage of said head therethrough, a blade containing magazine communicating with said passageway intermediate the length of said passageway and extending into the path of said face during an intermediate portion of the passage of said head through said passageway, means urging a magazine contained blade into the path of said face for engagement by said face, and means for retracting and advancing said clamp means, associated with said passageway and lying in the path of said clamp means during the passage of said head along said passageway.

16. A blade changer for use with a razor having a blade supporting head, said changer including a casing, a passageway extending from front to back of said casing for receiving and guiding said head, said passageway being open and unobstructed for the passage of said head therethrough in one direction only from the front through the back of said casing, a plurality of blades housed in said casing in stacked relation, one of said blades being positioned in said passageway for engagement by said head during said head passage through said casing.

17. Blade changing means for use with a razor having a blade supporting head equipped with disengageable blade engaging means and a casing for receiving and guiding said head for movement from front to back through said casing, said blade changing means comprising a forwardly projecting ejector member adapted to engage and strip a blade from said head, a magazine housing a plurality of new blades in stacked relation positioned rearwardly of said ejector member, said magazine having a rearwardly facing discharge opening dimensioned for the passage of a single blade therethrough, and spring means cooperating with said magazine to position one of said blades opposite said opening, said blade changing means being adapted for positioning in said casing with said ejector located in the path of said head movement through said casing and said magazine beyond said ejector member in said path.

18. In a device of the character described for use with a razor having a head equipped with releasable blade clamping means, a blade changing mechanism adapted for use in a casing to remove a used blade from the head of the razor and insert a new blade thereon when the head is moved in one direction through the casing, said mechanism including a member for stripping a used blade from the head, which member is adapted to be located in the casing in the path of movement of the head, a chamber for receiving used blades stripped from the head underlying the stripping member, and a holder for positioning a new blade on the head, which holder is adapted to contain a stack of new blades and is adapted to be located in the casing beyond said stripping member and said chamber in the path of movement of the head.

19. Razor blade equipment adapted for use with a razor blade supporting head having a pair of clamps for engaging a blade supported on said head, said clamps being attached to said head for movement from and to blade engaging position, which equipment includes a casing having a longitudinal passageway extending from front to rear of the casing to receive and pass a said head for movement longitudinally through said casing, a pair of opposite elongated cams extending longitudinally of the casing, each said clamp including operating means for effecting said clamp movement, said cams respectively projecting into the pathway through said casing of said operating means and being positioned to respectively engage said operating means during head movement through said casing and effect said clamp movement from blade engaging position.

20. Razor blade equipment adapted for use with a razor blade supporting head having a pair of side clamps for engaging a blade supported on said head, said clamps being attached to said head for movement from and to blade engaging position and including operating means for effecting said clamp movement, which equipment includes a casing having a longitudinal passageway extending from front to rear of the casing to receive and pass a said head for movement longitudinally through said casing, a pair of opposite elongated cams projecting into the path through said passageway of said operating means and being positioned to respectively engage said clamp operating means during said head movement and effect clamp movement from blade engaging position, resilient means fastened to said casing below said passageway and projecting upwardly toward said passageway, and a blade changer mechanism yieldingly supported by said resilient means projecting into said path of head movement.

21. An automatic blade changer for use with a blade holding head which head includes a blade engaging face, means for removably attaching a blade to said face, and spring means urging said attachment means into blade engagement; said changer including a longitudinal passageway extending from end to end of said changer and being open for the passage of said head therethrough, means associated with and adjacent one end of said passageway for releasing said blade attaching means against the action of said spring means for removal of a blade from said face during an initial portion of the passage of said head along said passageway, a magazine for containing blades communicating with said passageway intermediate the length of said passageway and extending into the path of said face during an intermediate portion of the passage of said head through said passageway, and means for urging a magazine contained blade into the path of said face for engagement by said face.

22. An automatic blade changer for use with a blade holding head which head includes a blade engaging face and means for removably attaching a blade to said face; said changer including a longitudinal passageway extending from end to end of said changer and being open for the passage of said head therethrough, means associated with and adjacent one end of said passageway for releasing said blade attaching means for removal of a blade from said face during an initial portion of the passage of said head along the passageway, a magazine for containing blades communicating with said passageway intermediate the length of said passageway and extending into the path of said face during an intermediate portion of the passage of said head through said passageway, and means for urging a magazine contained blade into the path of said face for engagement by said face.

23. Razor blade changing mechanism including a casing, a blade housing magazine mounted in said casing, and ejector means in said casing fixed relatively to said magazine and projecting away from one side of said magazine, said magazine including top wall means having access openings therein and said magazine having a discharge opening beneath said top and remote from said ejector means, communicating with said access openings.

24. Razor blade changing mechanism including a casing, a blade housing magazine mounted in said casing, and ejector means in said casing fixed relatively to said magazine and projecting away from one side of said magazine, said magazine including top wall means apertured to provide means for access to the interior of said magazine and a discharge opening remote from said ejector means, said discharge opening communicating with said access means.

25. An automatic blade changer for use with a blade holding head which head includes a blade engaging face and means for removably attaching a blade to said face; said changer including a longitudinal passageway extending from end to end of said changer and being open for the passage of said head therethrough, means associated with and adjacent one end of said passageway for releasing said blade attaching means for removal of a blade from said face during an initial portion of the passage of said head along said passageway, a magazine for containing blades communicating with said passageway intermediate the length of said passageway and extending into the path of said face during an intermediate portion of the passage of said head through said passageway, and means for urging a magazine contained blade into the path of said face for engagement by said face.

26. An automatic blade changer for use with a blade holding head which head includes a blade engaging face and means clamping a blade to said face; said changer including a longitudinal passageway extending from end to end of said changer and being open for the passage of said head therethrough, means associated with and adjacent one end of said passageway positioned to engage said clamping means during the initial portion of the passage of said head along said passageway to unclamp said clamping means and release said clamped blade from said face, a magazine for containing blades communicating with said passageway intermediate the length of said passageway and extending into the path of said face during an intermediate portion of the passage of said head through said passageway, and means for urging a magazine contained blade into the path of said face for engagement by said face.

27. A blade changer for use with a razor having a blade supporting head, said changer including a casing, a passageway extending from front to back of said casing for receiving and guiding said head, said passageway being open and unobstructed for the passage of said head therethrough in one direction only from the front through the back of said casing, a plurality of blades housed in said casing in stacked relation, one of said blades being positioned in said passageway for engagement by said head during said head passage through said casing, and resilient means acting on said stacked blades to urge said one blade into position in said passageway.

28. Razor blade equipment adapted for use with a razor head, for supplying a new razor blade to the razor head when the head is moved in one direction from front to rear through the equipment, said equipment comprising a casing having a passageway for head movement through said equipment, a holder for containing a plurality of new razor blades mounted in said casing underlying said passageway, spring means underlying and urging upwardly the blades contained in said holder, a top overlying said contained blades and preventing vertical blade discharge from said holder, said top being provided with at least one opening for access from above said top to the uppermost of said contained blades, and a rearwardly facing discharge opening communicating with said access opening for discharge of the uppermost said blade under engagement by a razor head through said access opening.

29. Razor blade equipment adapted for use with a razor head, for supplying a new razor blade to the razor head when the head is moved in one direction from front to rear through the equipment, said equipment comprising a casing having a passageway for head movement through said equipment, a holder for containing a plurality of new razor blades mounted in said casing underlying said passageway, a top overlying said contained blades and preventing vertical blade discharge from said holder, said top being provided with at least one opening for access from above said top to the uppermost of said contained blades, and a rearwardly facing discharge opening communicating with said access opening for discharge of the uppermost said blade under engagement by a razor head through said access opening.

30. A blade housing magazine adapted for use in a casing, a plurality of substantially horizontally disposed blades stacked in superposed relation and housed in said magazine, vertical wall means within said magazine adjacent the opposite sides of blades stacked in said magazine, substantially vertically disposed abutment means formed in said magazine positioned intermediate and spaced from said wall means and engaging end portions of blades stacked in said magazine to limit relative unstacking movement of said blades, top means forming part of said magazine overlying said wall means and said stacked blades and limiting vertical movement of said stacked blades, said abutment means being cut off adjacent said top means and opposite the uppermost of said stacked blades to free said uppermost blade for unstacking movement, and a discharge opening in said magazine overlying one of said wall means and alined with said uppermost blade for discharge of said uppermost blade from said magazine.

31. A blade housing magazine adapted for use in a casing, said housing including spaced wall means, a plurality of blades stacked in superposed relation and housed in said magazine between said wall means, abutment means formed in said magazine positioned intermediate and spaced from said wall means and engaging blades stacked in said magazine to limit relative unstacking movement of said blades, said abutment means being cut off opposite one of said stacked blades to free said one blade for unstacking movement, and a discharge opening in said magazine alined with said one blade for discharge of said one blade from said magazine, said discharge opening overlying one of said wall means.

32. A blade housing magazine adapted for use in a casing to house a plurality of substantially horizontally disposed blades stacked in superposed relation, said magazine including substantially vertically disposed, horizontally spaced wall means defining a chamber for receiving a plurality of superposed blades, substantially vertically disposed abutment means formed in said magazine positioned intermediate and spaced from said wall means for engaging end portions of blades stacked in said magazine to limit relative unstacking movement of the blades, top means forming the upper part of said magazine overlying and limiting vertical movement of blades stacked in said magazine, said abutment means being cut off adjacent said top means and opposite the uppermost of the blades when stacked in said magazine to free the uppermost blade for unstacking movement, and a discharge opening in said magazine alined with the cut off portion of said abutment means for discharge of the uppermost blade from said magazine.

33. A blade housing magazine adapted for use in a casing to house a plurality of blades stacked in superposed relation, said magazine including spaced wall means defining a chamber for receiving a plurality of superposed blades, abutment means formed in said magazine and positioned in said chamber intermediate and spaced from said wall means for engaging blades stacked in said magazine to limit relative unstacking movement of said blades, said abutment means being cut off opposite one of the blades when stacked in said magazine to free said one blade for unstacking movement, and a discharge opening in said magazine alined with the cut off portion of said abutment means for discharge of the said one blade from said magazine.

34. A blade housing magazine adapted for use in a casing to house a plurality of blades stacked in face to face relationship, said magazine including a first pair of walls, a second pair of walls, a top substantially perpendicular to said walls, said walls and said top defining a blade chamber, abutment means in said chamber formed in the walls of one said pair intermediate and spaced from the walls of the other said pair to engage an intermediate part of end portions of blades when stacked in said chamber, said abutment means being of a length less than the depth of at least one of the walls of said other pair, said top being spaced from said abutment means and the other wall of said other pair to establish an opening for discharge of a single blade from said chamber.

35. A blade housing magazine adapted for use in a casing to house a plurality of blades stacked in face to face relationship, said magazine including a pair of upstanding end walls, a second pair of upstanding walls comprising a front wall and a rear wall, a top overlying said walls, said walls and said top defining a blade chamber, upstanding abutment means in said chamber formed in said end walls, intermediate and spaced from said second pair of walls to engage end portions of blades when stacked in said chamber, said abutment means being of a length less than the depth of at least one of said second pair of walls, said top being spaced from said abutment means and the other wall of said second pair to establish an opening for discharge of a single blade from said chamber.

References Cited in the file of this patent
UNITED STATES PATENTS

| | | |
|---|---|---|
| 2,304,314 | Muras | Dec. 8, 1942 |
| 2,361,512 | Testi | Oct. 31, 1944 |